United States Patent
Gallagher

(10) Patent No.: US 7,896,509 B2
(45) Date of Patent: Mar. 1, 2011

(54) ANTI-PICTURE DEVICE

(75) Inventor: Frank Gallagher, Clayton, CA (US)

(73) Assignee: Frank L. Gallagher, Clayton, CA (US)

( * ) Notice: Subject to any disclaimer, the term of this patent is extended or adjusted under 35 U.S.C. 154(b) by 339 days.

(21) Appl. No.: 11/903,212

(22) Filed: Sep. 21, 2007

(65) Prior Publication Data

US 2009/0080181 A1  Mar. 26, 2009

(51) Int. Cl.
*G03B 15/02* (2006.01)
(52) U.S. Cl. .............................. 362/3; 362/11; 362/16; 362/18; 396/56; 396/171; 396/155
(58) Field of Classification Search .................. 362/3, 362/11, 16, 18; 396/56, 171, 155
See application file for complete search history.

(56) References Cited

U.S. PATENT DOCUMENTS

| | | | | |
|---|---|---|---|---|
| 5,115,264 A | * | 5/1992 | Schappler | ................... 396/423 |
| 5,978,597 A | * | 11/1999 | Stephenson, III | .............. 396/6 |
| 6,168,057 B1 | * | 1/2001 | Schwabe | .................... 224/269 |
| 6,742,901 B2 | * | 6/2004 | Kimura et al. | .............. 353/122 |
| 6,773,119 B2 | * | 8/2004 | Kimura et al. | .............. 353/122 |
| 6,937,163 B2 | * | 8/2005 | Caulfield et al. | ............ 340/937 |
| 2001/0048812 A1 | * | 12/2001 | Kameyama et al. | ........... 396/89 |
| 2006/0159440 A1 | * | 7/2006 | Purkayastha et al. | .......... 396/89 |

* cited by examiner

*Primary Examiner*—Sandra L O Shea
*Assistant Examiner*—Danielle Allen

(57) ABSTRACT

The Anti-Picture with a means for detecting camera's radio frequency, a way of decoding said detected radio frequency, a switch/driver to trigger device, a way of producing light with one or more lighting elements, means of allowing said lighting element to reflect off of a one or more reflective surface to allow light to be directed and a means for all of said above to be encased a body wherein the said components are able to communicate with a light element allowing the light to reflect off of the said reflective surfaces to over expose and or interrupt a photograph.

5 Claims, 4 Drawing Sheets

ANTI-PICTURE DEVICE

CROSS REFERENCE TO RELATED APPLICATION

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

There is a growing trend of paparazzi taking photographs of people who do not want to participate i.e. celebrities. The paparazzi invade people privacy at almost any cost; there is almost no legal recourse for celebrities to fight back. Many people will go through great lengths to avoid having their picture taken sometimes putting them and other around them in great danger. As such there is a need for a device that hampers the taking of ones picture unwillingly.

BRIEF SUMMARY OF THE INVENTION

The primary objective is to provide a device to aid in privacy while in public against unwanted photographs from being taken.

Another objective is to help prevent against a form of identity theft in which a person's image is taken unwillingly and or unknowingly.

BRIEF DESCRIPTION OF THE DRAWINGS

The drawings constitute a part of this specification and include exemplary embodiments of the invention, which may be embodiment in various forms. It is to be understood that in some instances various aspects of the invention may be shown exaggerated or enlarged to facilitate an understanding of the invention.

DETAILED DESCRIPTION OF THE INVENTION

Detailed descriptions of the preferred embodiment are provided herein. It is to be understood, however that the present invention may be embodied in various forms. Therefore, specific details disclosed herein are not to be interpreted as limiting, but rather as a basis for the claims and as a representative basis for teaching one skilled in the arts to employ the present invention in virtually any appropriately detailed system, structure or manner.

Figure 1:
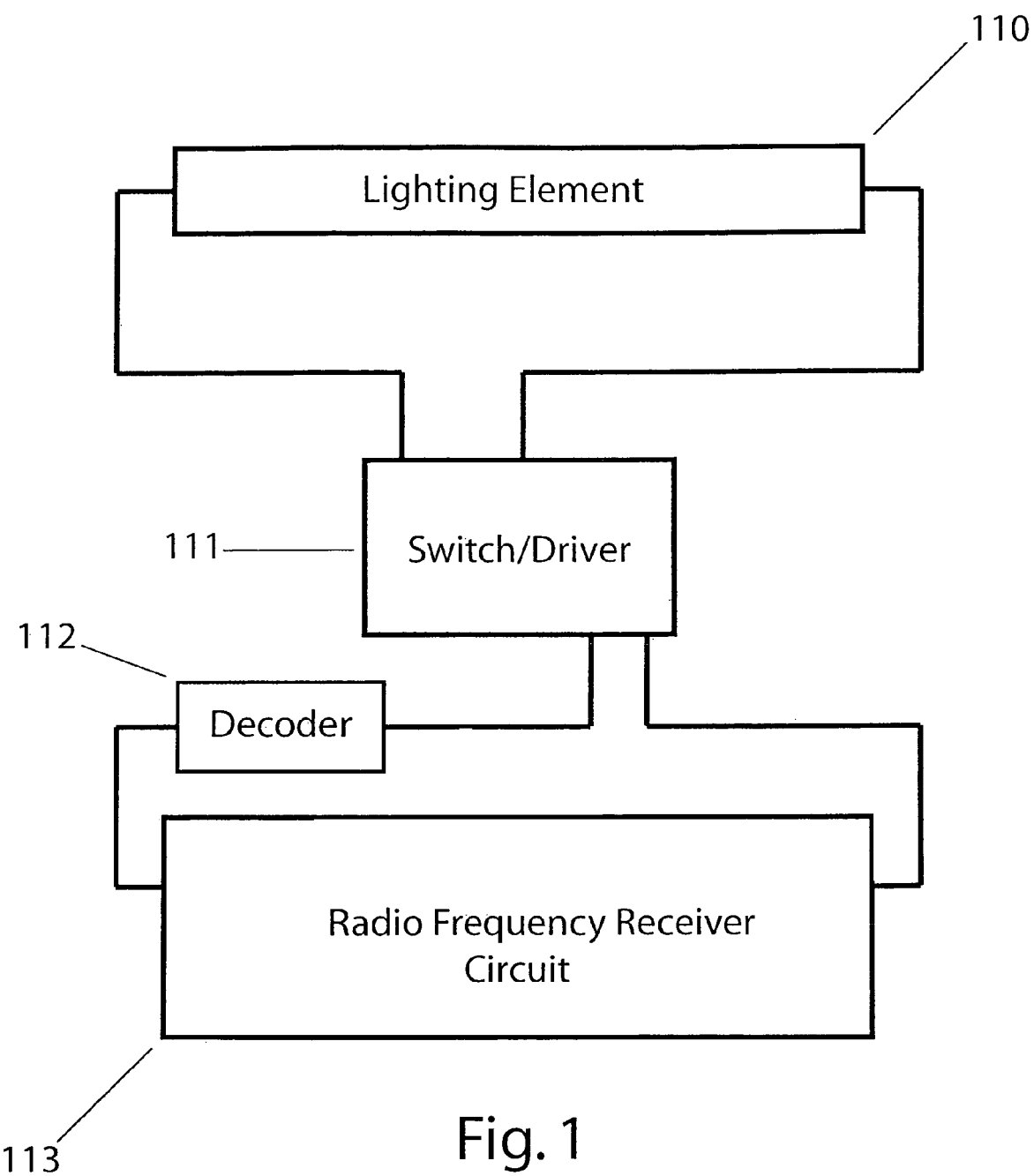
FIG. 1 is a block diagram showing the circuit layout.

Referring now to FIG. 1 is a circuit diagram showing items lighting element 110, which is connected to switch/driver 111 which can be manually trigger by user or decoder 112 which can decode information from the radio frequency receiver 113 to automatically trigger lighting element 110. The Radio Frequency Receiver circuit is to detect a camera's slave flash frequency and relay the information to the Decoder 112 which in turns triggers the Switch/Drive 111 in turn causing the Lighting Element 110 to fire and cause the photograph to be over exposed and in turn render it useless.

Figure 2:
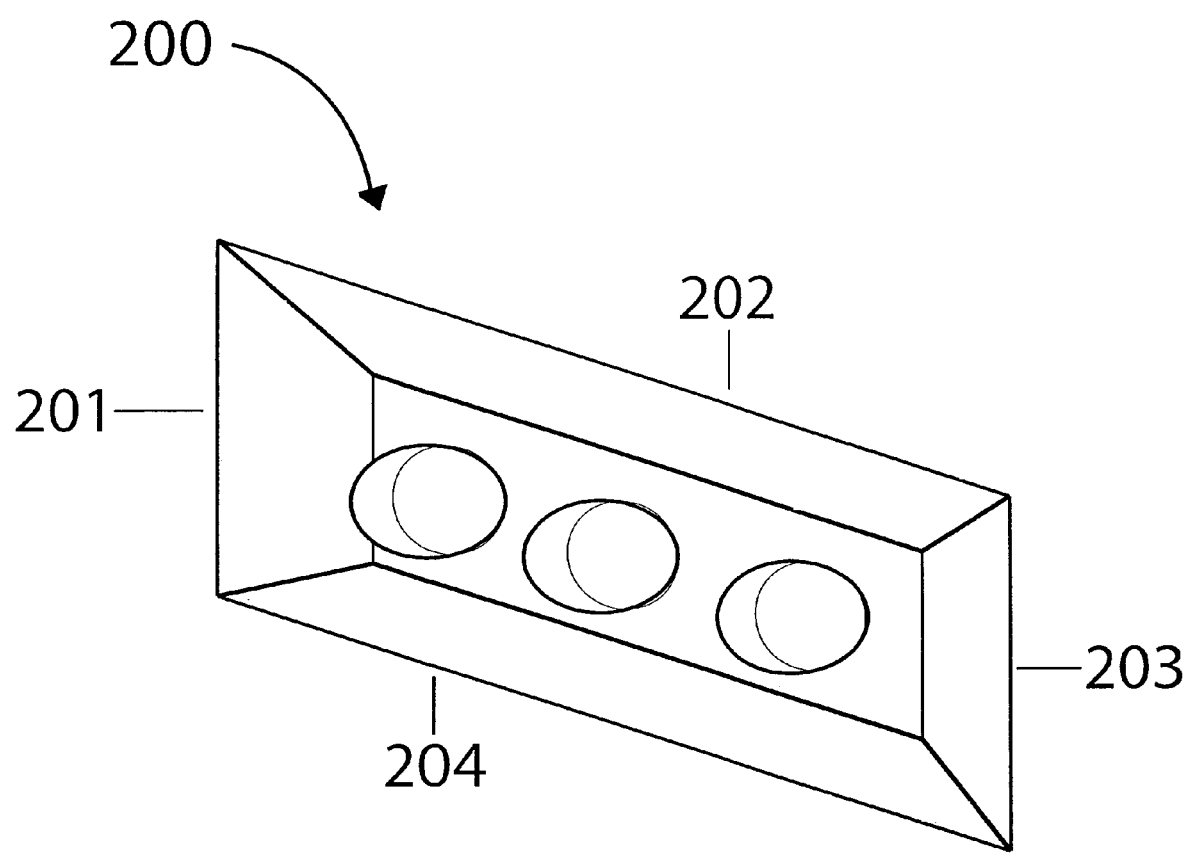
FIG. 2 is a perspective view showing one embodiment.

FIG. 2 shows the perspective view of 200 one form of an embodiment. Reflective surfaces 201, 202, 203, and 204 can be made of but are not limited to glass mirror, mirrored plastic, polished metal, and or any material that can be used to reflect light.

Figure 3:
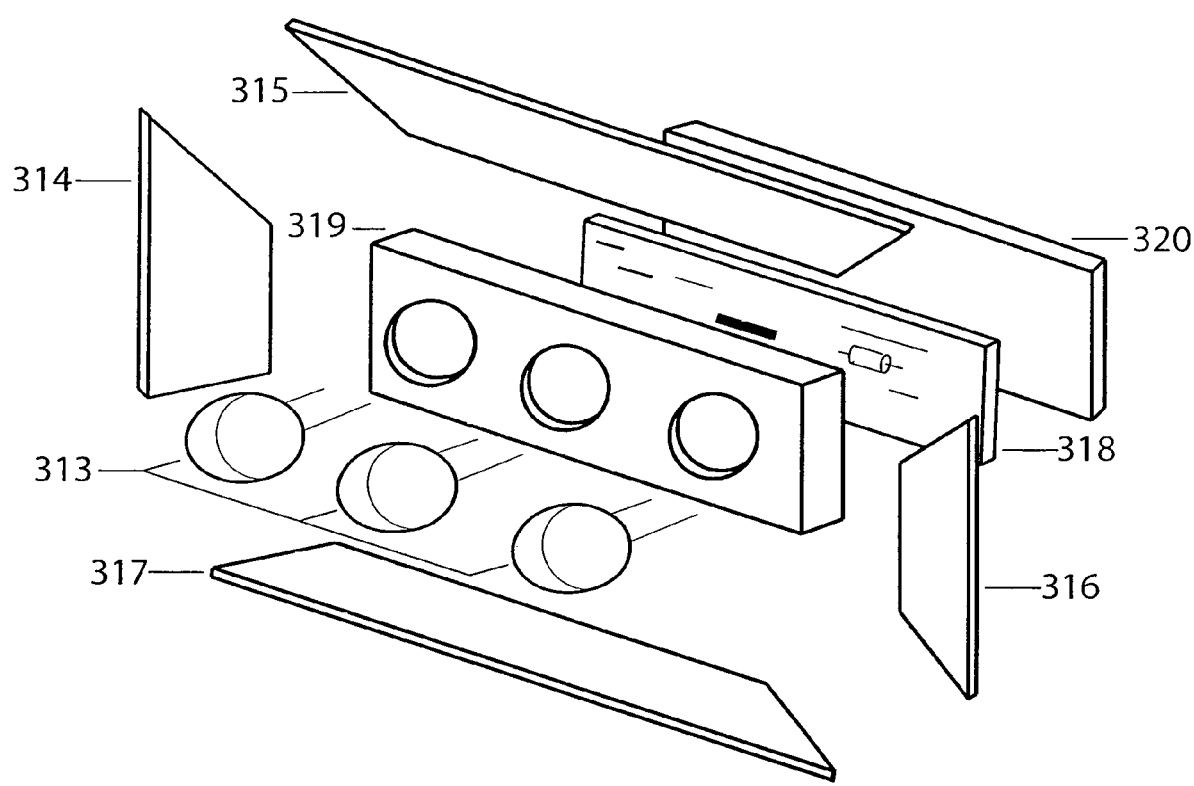
FIG. 3 is an exploded view of one embodiment.

FIG. 3 is an exploded view showing one possible embodiment and parts location. Lighting elements 313 are used for producing light, reflective surfaces 314, 315, 316 and 317 are used to direct the light in a desired direction. Component housing 318 houses the radio frequency receiver, decoder, switch/trigger, and battery which are to communicate with light elements 313 to cause Lighting Element 313 to ignite. Front half case 319 is of the body and rear case 320; combined items 319&320 are used to hold items 313, 314, 315, 316, 317, & 318 as one unit.

Figure 4:
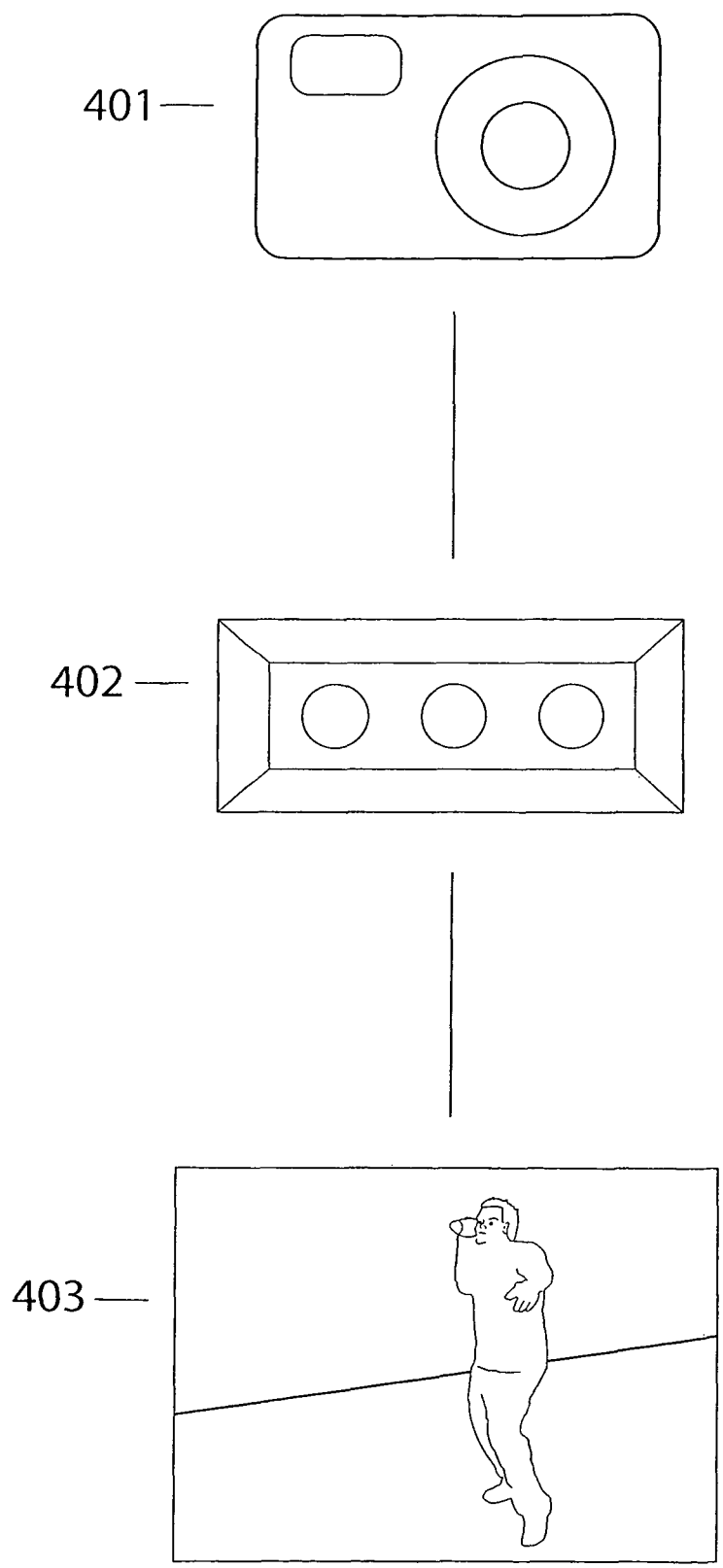
FIG. 4 is a diagram to add to the understanding of the device.

FIG. 4 is a diagram to show the relationship between the camera, device, and user. This diagram is to show where the device is in the picture taking process. The camera 401 is interrupted by the Anti-Picture Device 402 in the picture taking process as camera 401 is trying to capture the image 403. By being able to cause a controlled and directed light source using Anti-picture taking device 402 the user can over expose the photograph making the image unusable therefore protecting their identity and privacy.

While the invention has been described in connection with a preferred embodiment, it is not intended to limit the scope of the invention to the particular form set fourth, but on the contrary, it is intended to cover such alternatives, modifications, and equivalents as may be included within the spirit and scope of the invention as defined by the appended claims.

What is claimed is:

1. A device to aid in not having the user's photograph taken unwilling, the device comprising:
   a. a means for detecting a camera's radio frequency;
   b. a means for decoding said detected radio frequency;
   c. a means for triggering said device;
   d. a means of producing light with one or more lighting elements;
   e. a means of allowing said lighting element to reflect off of one or more reflective surfaces to allow light to be directed;
   f. a means of portable power and;
   g. said device is encased as one unit wherein the said means for detecting is able to communicate with a lighting element allowing the light to reflect off of the said reflective surfaces to over expose or interrupt a photograph.

2. The device in claim 1 in which the device is able to be worn in multiple ways.

3. The device in claim 1 in which the reflective surfaces are adjustable.

4. The device in claim 1 in which the device can have the lighting elements able to be manually triggered.

5. A method of interfering with the taking of a photograph comprising the following steps:
   a. detecting a radio frequency or flash from a camera;
   b. triggering an illumination source;
   c. directing the illumination with the use of one or more reflective surfaces;
   d. and having all said components encased where the user can wear it on their person making the components portable.

* * * * *